US012140929B2

(12) United States Patent
Lee et al.

(10) Patent No.: US 12,140,929 B2
(45) Date of Patent: Nov. 12, 2024

(54) ELECTRONIC APPARATUS AND SERVICE PROVIDING METHOD THEREOF

(71) Applicant: Samsung Electronics Co., Ltd., Suwon-si (KR)

(72) Inventors: Ga-eun Lee, Seoul (KR); Se-rin Ko, Seoul (KR); Min-shik Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 16/754,032

(22) PCT Filed: Aug. 21, 2018

(86) PCT No.: PCT/KR2018/009584
§ 371 (c)(1),
(2) Date: Apr. 6, 2020

(87) PCT Pub. No.: WO2019/078469
PCT Pub. Date: Apr. 25, 2019

(65) Prior Publication Data
US 2020/0326685 A1    Oct. 15, 2020

(30) Foreign Application Priority Data
Oct. 19, 2017   (KR) .................. 10-2017-0136057

(51) Int. Cl.
*G05B 19/4155*   (2006.01)
*B25J 9/00*   (2006.01)
(Continued)

(52) U.S. Cl.
CPC ........ *G05B 19/4155* (2013.01); *B25J 9/0003* (2013.01); *B25J 9/1679* (2013.01);
(Continued)

(58) Field of Classification Search
CPC ........ G05B 19/00; G05B 19/02; G05B 19/18; G05B 19/4155; G05B 2219/00;
(Continued)

(56) References Cited

U.S. PATENT DOCUMENTS 6,697,707 B2   2/2004   Peters, II
7,216,082 B2   5/2007   Okubo et al.
(Continued)

FOREIGN PATENT DOCUMENTS

JP   2005-508761 A   4/2005
JP   4126291 B2   7/2008
(Continued)

OTHER PUBLICATIONS

Korean Office Action dated Aug. 3, 2021, issued in Korean Application No. 10-2017-0136057.

*Primary Examiner* — Khoi H Tran
*Assistant Examiner* — Sarah A Tran
(74) *Attorney, Agent, or Firm* — Jefferson IP Law, LLP

(57) ABSTRACT

An electronic device is disclosed. The electronic device comprises: a communication unit connected to a network; and a processor for searching for, through the communication unit, a robot, which can perform an operation required for a service, among robots for providing different services, and providing the service by controlling an operation of the searched-for robot, when the service is requested from one of other electronic devices connected through the network.

13 Claims, 8 Drawing Sheets

(51) Int. Cl.
  *B25J 9/16* (2006.01)
  *B25J 11/00* (2006.01)
  *G06F 9/48* (2006.01)
  *G16Y 10/75* (2020.01)
  *G16Y 40/35* (2020.01)

(52) U.S. Cl.
  CPC ........... *B25J 11/008* (2013.01); *G06F 9/4887* (2013.01); *G05B 2219/34348* (2013.01); *G16Y 10/75* (2020.01); *G16Y 40/35* (2020.01)

(58) Field of Classification Search
  CPC ........... G05B 2219/30; G05B 2219/34; G05B 2219/34348; B25J 9/00; B25J 9/0003; B25J 9/16; B25J 9/1679; B25J 11/00; B25J 11/008; B25J 11/0085; B25J 11/009; G06F 9/00; G06F 9/06; G06F 9/46; G06F 9/48; G06F 9/4806; G06F 9/4843; G06F 9/4881; G06F 9/4887; G06F 9/50; G06F 9/5005; G06F 9/5011; G06F 2209/00; G06F 2209/50; G06F 2209/5017; G16Y 10/00; G16Y 10/75; G16Y 40/00; G16Y 40/30; G16Y 40/35; A47L 11/00; A47L 11/40; A47L 11/4011; A47L 2201/00; A47L 2201/06; H04L 29/00; H04L 29/02; H04L 29/06; H04L 29/08; H04L 67/00; H04L 67/12; H04L 67/125; H04L 67/32; H04L 67/322; H04L 67/325; H04L 67/327
  USPC ........................................................ 700/248
  See application file for complete search history.

(56) References Cited

U.S. PATENT DOCUMENTS

| | | | |
|---|---|---|---|
| 8,392,341 | B2 | 3/2013 | Lee |
| 8,428,777 | B1 * | 4/2013 | Poursohi ........... G05B 19/41865 700/247 |
| 9,002,520 | B2 | 4/2015 | Hong et al. |
| 2005/0041839 | A1 * | 2/2005 | Saitou ................ H04N 1/00137 382/103 |
| 2014/0172123 | A1 | 6/2014 | Lee et al. |
| 2014/0340796 | A1 | 11/2014 | Sandhu et al. |
| 2017/0050321 | A1 * | 2/2017 | Look ................ G06Q 10/06398 |
| 2017/0168872 | A1 * | 6/2017 | Kim ....................... G06F 9/4887 |
| 2018/0292827 | A1 * | 10/2018 | Artes .................... G05D 1/0088 |
| 2020/0225673 | A1 * | 7/2020 | Ebrahimi Afrouzi ....................... G05D 1/0016 |

FOREIGN PATENT DOCUMENTS

| | | | | |
|---|---|---|---|---|
| JP | 2016-068161 | A | 5/2016 | |
| JP | 2016-208110 | A | 12/2016 | |
| KR | 10-2003-0007713 | A | 1/2003 | |
| KR | 10-2008-0046964 | A | 5/2008 | |
| KR | 10-1038309 | B1 | 6/2011 | |
| KR | 10-2013-0104777 | A | 9/2013 | |
| KR | 10-2014-0077489 | A | 6/2014 | |
| KR | 10-1403108 | B1 | 6/2014 | |
| KR | 10-1408657 | B1 | 6/2014 | |
| KR | 10-1487784 | B1 | 1/2015 | |
| KR | 10-1553521 | B1 | 9/2015 | |
| KR | 10-2015-0126106 | A | 11/2015 | |
| KR | 10-2017-0027918 | A | 3/2017 | |
| KR | 10-2017-0067917 | A | 6/2017 | |
| KR | 10-2017-0109954 | A | 10/2017 | |
| WO | WO-2017097893 | A2 * | 6/2017 | ............ B25J 9/1664 |
| WO | WO 20170050321 | | * 6/2017 | ............ B25J 9/1664 |

\* cited by examiner

FIG. 4

| TASK | NECESSARY OPERATION |
|---|---|
| 1. GATHER LAUNDRY<br>(1) COLLECT LAUNDRY<br>(2) DUST OFF DIRT FROM LAUNDRY | USE ONE HAND, USE BOTH HANDS, RECOGNIZE OBJECT, MOVE PICK UP, SHAKE, RELOCATE |
| 2. SORT LAUNDRY<br>(1) SORT BY MATERIAL, BY COLOR | USE ONE HAND, USE BOTH HANDS, RECOGNIZE OBJECT |
| 3. USE WASHER<br>(1) OPEN WASHER DOOR<br>(2) PUT IN LAUNDRY<br>(3) SET WASHER<br>(4) CLOSE WASHER DOOR<br>(5) OPEN WASHER DOOR AFTER WASHING<br>(6) TAKE OUT & MOVE LAUNDRY | USE ONE HAND, USE BOTH HANDS, GRAB, PULL, RECOGNIZE OBJECT, PICK UP, RELOCATE, COMMUNICATE WIRELESSLY WITH WASHER, MOVE |
| 4-1. USE DRYER<br>(1) OPEN DRYER DOOR<br>(2) SORT & PUT IN LAUNDRY<br>(3) SET DRYER<br>(4) CLOSE DOOR AFTER DRYING<br>(5) OPEN DRYER DOOR AFTER DRYING<br>(6) TAKE OUT & MOVE LAUNDRY | USE ONE HAND, USE BOTH HANDS, GRAB, PULL, RECOGNIZE OBJECT, PICK UP, RELOCATE, COMMUNICATE WIRELESSLY WITH DRYER, MOVE |
| 4-2. NATURAL DRYING<br>(1) SORT LAUNDRY<br>(2) HANG ON HANGER OR DRYING RACK<br>(3) COLLECT & MOVE LAUNDRY AFTER DRYING | USE ONE HAND, USE BOTH HANDS, RECOGNIZE OBJECT, PICK UP, RELOCATE, LAY OUT LAUNDRY, HANG, MOVE |
| 5. ORGANIZE LAUNDRY<br>(1) FOLD LAUNDRY<br>(2) STORE LAUNDRY | USE ONE HAND, USE BOTH HANDS, RECOGNIZE OBJECT, PICK UP |

ROBOT A
FUNCTION: ROBOT CLEANER
PERFORMABLE OPERATION:
MOVE, SUCK IN DUST,
CHARGE AUTOMATICALLY, COMMUNICATE

ROBOT B
FUNCTION: SECURITY ROBOT
PERFORMABLE OPERATION:
RECOGNIZE OBJECT,
COMMUNICATE, CAPTURE IMAGE

ELECTRONIC APPARATUS AND SERVICE PROVIDING METHOD THEREOF

TECHNICAL FIELD

The disclosure relates to an electronic apparatus and a service providing method thereof, and more specifically to an electronic apparatus controlling a robot in an Internet of Things (IoT) environment and a service providing method thereof.

BACKGROUND ART

With the development of electronic technology, network environments such as home networks or Internet of Things (IoT) have increased. In particular, with sensors and communication functions being built in various objects, interest in IoT technology connecting to the internet have recently greatly increased. The object here may be various systems such as home appliances, mobile equipment, wearable computers, and robots. The objects which are connected to IoT may be connected to the internet with unique internet protocols (IPs) that is capable of distinguishing itself, and may be equipped with a sensor to obtain data from an external environment.

With developments in machinery and electronic field, technology in the field of robots are also rapidly developing. Recently, households furnished with robot cleaners, educational robots, and the like are increasing, and studies on a humanoid robot with similar appearance to human body are also progressing rapidly.

Robots have been development for specific services such as cleaning and security, and because the robots include hardware and software designed to perform functions appropriate to a relevant service, users have been able to use robots for only their original purpose and there have been difficulty in using robots for other purposes.

However, there is increasingly a gradual need by users for robots to, not only provide the original service of the robot, but also handle even incidental tasks that are inconvenient and troublesome for users.

DISCLOSURE

Technical Problem

The disclosure is to solve the above-described problem, and an object of the disclosure is to provide an electronic apparatus that uses a plurality of operations capable of being performed by one robot, and utilizing the robot in other services other than the service to be performed by the robot, and a service providing method thereof.

Technical Solution

According to an embodiment of the disclosure, an electronic apparatus includes a communicator connected to a network and a processor configured to, based on a service being requested from one of other electronic apparatuses connected through the network, search for a robot capable of performing an operation required in the service from robots providing services different from the service through the communicator, and provide the service by controlling an operation of the searched robot.

Further, a storage stored with tasks necessary for each type of service, operations required for performing the task, and an operation information of a robot connected to the network and performable by the robot may be further included, and the processor may search for at least one or more robots capable of performing an operation necessary in performing a task corresponding to the requested service, and transmit a control instruction to the searched robot for a series of operations necessary in performing the task to be sequentially performed The processor may, based on receiving operation information from a robot connected to the network, add the received operation information to the storage.

In addition, the processor may, based on a scheduling information of a user being input through the communicator, identify a completion time for each task according to the scheduling information of the user, and schedule a work time of a robot performing an operation required by each task according to the completion time.

The processor may, based on a plurality of services being requested through the communicator, schedule a work time of the robot taking into consideration tasks required in each service and operations included in the relevant task.

In addition, the processor may transmit a request for verifying whether performing of an operation related to the identified task is performed to the other electronic apparatus, and based on receiving a verification instruction on the performing of the operation from the other electronic apparatus, transmit a perform instruction of an operation related to the identified task to the robot Further, the processor may transmit information on a task assigned to the robot and a work time for performing the task to the other electronic apparatus through the communicator.

According to an embodiment of the disclosure, a service providing method using an electronic apparatus connected to a network includes receiving a service request from one of electronic apparatuses connected through the network, searching for a robot capable of performing an operation required by the service from robots providing services different from the requested service on the network, and providing the service by controlling an operation of the searched robot.

Further, the searching for the robot may include searching for a robot capable of performing an operation necessary in performing a task corresponding to the requested service based on a storage stored with information on tasks required for each type of service, operations necessary in performing the task, robots connected to the network and operations performable by the robot.

Based on receiving operation information from a robot connected to the network, the received operation information may be added to the storage.

In addition, based on scheduling information of a user being input, a step of identifying a completion time for each task according to the scheduling information of the user and scheduling a work time of a robot performing an operation required in each task according to the completion time may be further included.

Further, based on a plurality of services being requested, a step of scheduling a work time of the robot taking into consideration a task required in each service and operation included in the relevant task may be further included.

In addition, a step of transmitting a request for verifying whether performing of an operation related to the identified task is performed to the electronic apparatus and a step of transmitting a perform instruction of an operation related to the identified task to the robot based on receiving a verification instruction on performing of the operation from the electronic apparatus may be further included.

Further, a step of transmitting information on a task assigned to the robot and a work time in performing the task to the electronic apparatus may be further included.

Effect of Invention

According to various embodiments of the disclosure as described above, as a robot performs other additional tasks than the original services that the robot is set to perform at the time of manufacturing, a user may utilize the robot in various ways and be provided with various services.

DESCRIPTION OF DRAWINGS

FIG. 4 is a diagram for identifying a task capable of being performed by a robot according to an embodiment of the disclosure;

BEST MODE FOR IMPLEMENTING THE DISCLOSURE

Detailed Description of Exemplary Embodiments

Figure 1:
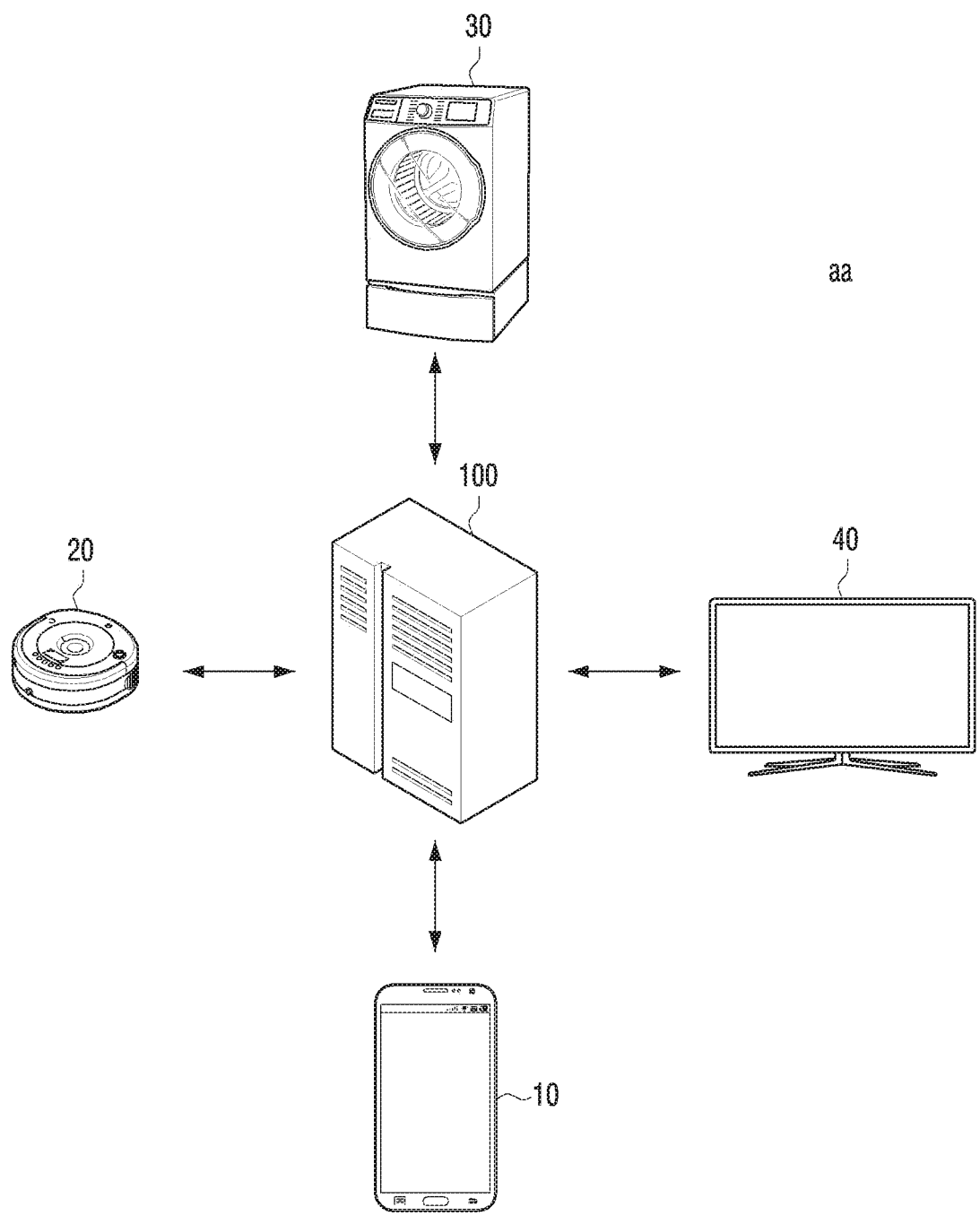
FIG. 1 is a diagram for describing a configuration of a system according to an embodiment of the disclosure.

The terms used herein may be general terms that are possibly widely used at present taking in consideration of the characteristics of the various embodiments of the disclosure. However, these terms may vary depending on intention, legal or technical interpretation, emergence of new technologies, and the like of those skilled in the related art. In addition, there may be some terms arbitrarily identified by an applicant, and the specific definition of the term may be described in the description. Accordingly, the terms used herein may be construed based on the overall contents and technological common sense of those skilled in the related art.

The terms such as "first," "second," and so on may be used to designate various elements herein. However, the terms are not to limit the order, characteristics, number and the like of the elements, but used only for the purpose of distinguishing one element from another.

The terms used herein are used only to describe a specific embodiment, and not intended as limiting scope of the claims. A singular expression includes a plural expression, unless otherwise specified. When a part is described herein as "comprising" or "constituting" a certain element, it should be interpreted as further comprising another element rather than excluding one other element, unless otherwise specified.

The terms such as "part", "module," and so on used herein refer to a unit that processes at least one function or operation, and the above may be implemented as hardware or software, or a combination of hardware and software. Further, except for when each of a plurality of "modules", "units", "parts", and the like are required to be implemented in a specific hardware, the units may be integrated in at least one module and implemented in at least one processor (not shown).

The embodiments of the disclosure may be described in detail below with reference to the accompanying drawings to enable one of ordinary skill in the technical field to which the disclosure pertains to easily practice the disclosure. However, the disclosure may be implemented to various different forms, and are not limited to the embodiments described herein. Further, parts unrelated to the description have been omitted from the drawings to clearly describe the disclosure, and like reference numerals have been affixed to like parts throughout the specification The various embodiments of the disclosure may be described in detail below with reference to the accompanying drawings.

FIG. 1 is a diagram for describing a configuration of a system according to an embodiment of the disclosure.

As illustrated in FIG. 1, a system 100 may include a server 100 and electronic apparatuses 10 to 40.

The server 100 and at least one electronic apparatus 10 to 40 may constitute an Internet of Things (IoT) environment.

The electronic apparatuses 10 to 40 constituting an IoT environment may use various communication networks to connect and communicate with one another through the server 100. However, the embodiment is not limited thereto, and the electronic apparatuses 10 to 40 may communicate and be directly connected in a device to device (D2D) communication method without communicating through the server 100. In addition, the electronic apparatuses 10 to 40 may perform communication with the server 100 through a gateway.

Because the object in the IoT is not limited by the type thereof, the type of electronic apparatuses 10 to 40 constituting the IoT environment may not also be limited to a mobile phone 10, a robot 20, a washer 30, and a television (TV) 40 illustrated in FIG. 1. For example, the electronic apparatuses 10 to 40 may be implemented to a personal computer (PC), a smart pad, a notebook, a camera, and the like.

The server 100 may be an apparatus for connecting communication between electronic apparatuses. The server 100 may be an external network device such as a cloud server, or a local network device such as a router or a home server. Alternatively, the server 100 may be implemented as an embedded server built in TVs or refrigerators and not as a server comprising a separate independent body.

The mobile phone 10 from the electronic apparatuses may receive input on various control instructions from the user. The mobile phone 10 may transmit a control instruction to the server 100, and the server 100 may transmit the control instruction to other electronic apparatuses 20, 30 and 40.

The robot 20 may refer to an apparatus constituted by a hardware (H/W) or a software (S/W) performing a specific function. In FIG. 1, the robot 20 has been illustrated as a robot cleaner, but the type and form of the robot 20 may be variously implemented. The robot cleaner 20 may perform functions such as move, collect dust, recognize obstacle, charge, and photograph to perform a cleaning service. In order to perform the functions, the robot 20 may include a camera, an ultrasonic distance sensor, a communication module, and the like. In an another example, if the robot is implemented as a robot butler to perform errands and miscellaneous work of a user, the robot 20 may include hardware such as a camera, a detection sensor, and a robotic arm and software applied with an algorithm for operations such as recognize object, move, pick up, and relocate.

As described above, the robot may perform various operations to provide a service. The function of the robot may refer to an assembly of pre-set operations based on the purpose of manufacturing the robot, and the operation of the robot may refer to work which may be performed using hardware (H/W) and software (S/W).

For example, a function of the robot cleaner may be divided into automatic cleaning, manually designated cleaning, charging, automatic charging, and the like, and an operation of the robot cleaner may be divided into planar motion, object recognition, ultrasonic sensor, distance measurement, suction, and the like. In order to perform an automatic cleaning function of the robot cleaner, operations such as recognize object, move, measure distance, suction, and automatic charging may be operated.

The server 100 may provide respective electronic apparatuses 10 to 40 to selectively provide a service providable by each electronic apparatus within the system according to user instruction. For example, if a user selects a cleaning service, the server 100 controls the robot cleaner 20 to perform cleaning on its own.

If a user selects a service that the system may not easily provide, the server 100 may identify whether the service is possible considering operations performable by the electronic apparatuses 10 to 40, respectively. In the above-described example, if a washing service is selected when laundry is not in the washer, the server 100 may search for an apparatus capable of performing a series of operations necessary in the washing service, and perform the relevant services by sequentially controlling the searched apparatuses.

Figure 2:
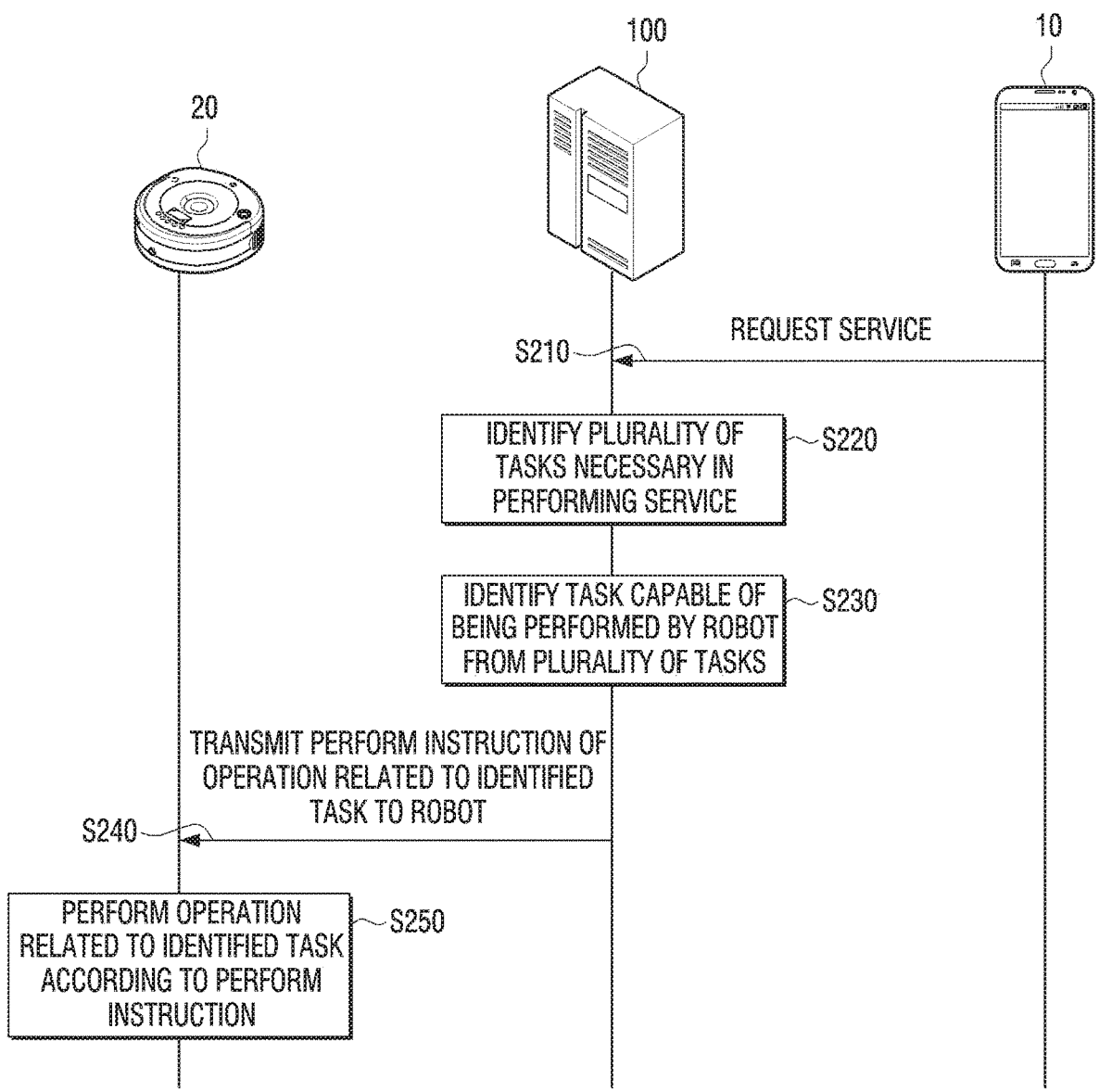
FIG. 2 is a diagram for describing in detail a service providing method according to an embodiment of the disclosure.

FIG. 2 is a diagram for describing in detail a service providing method according to an embodiment of the disclosure.

The user may request service to the server 100 using an electronic apparatus 10 (S210). The service may refer to work desired by the user such as washing, cleaning, and organizing, and one service may include a plurality of tasks. The task may refer to a plurality of work required to perform one service, and may refer to a unit of work that divides service to a performing step basis or a working space basis.

For example, the washing service may include a plurality of tasks such as gather laundry, sort laundry, use washer, use dryer, and organize laundry. In addition, the cleaning service may include tasks such as organize floor, sweep floor, and wipe floor based on the step at which service is being provided, and include tasks such as clean room 1, clean room 2, clean living room, clean kitchen, and clean entrance based on the space in which service is being provided.

The server 100, which received a service request from the electronic apparatus 10, may identify a plurality of tasks necessary in performing the service requested by the user (S220).

The server 100 may use a function and operation information of a robot to identify the task the robot 20 may perform from the plurality of tasks necessary in performing a service (S230).

For example, when one operation from operations necessary in performing a task and one operation from the plurality of operations capable of being performed by a robot match, the robot may identify the operation of the relevant task as performable. Based on one or two or more robots being present in performing the plurality of operations required in performing the task, the relevant task may be a task that one or two or more robots may perform.

The server 100 may then transmit an operation perform instruction necessary in performing the task to the robot 20 (S240), and the robot 20 that received the operation perform instruction may perform an operation related to the identified task according to the perform instruction (S250).

For example, based on robot A identifying that a 'move' operation is to be performed and robot B identifying that a 'recognize object' operation is to be performed in order to perform 'gather laundry' service, the server 100 may transmit a move instruction signal to robot A and a recognize object instruction to robot B, and robot A that received the 'move' operation perform instruction may perform the move operation and robot B that received the 'recognize object' operation perform instruction may perform the recognize object operation.

Figure 3:
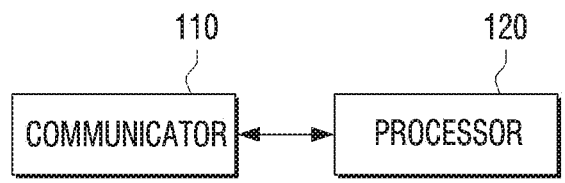
FIG. 3 is a block diagram for describing a configuration of a server according to an embodiment of the disclosure.

FIG. 3 is a block diagram for describing a configuration of a server according to an embodiment of the disclosure.

Referring to FIG. 3, the server 100 may include a communicator 110 and a processor 120.

The communicator 110 (i.e., communicator comprising circuitry) may be a configuration that is connected to a network to perform communication with at least one other electronic apparatus. The communicator 110 may be connected to each of the electronic apparatuses through various communication interfaces such as Wi-Fi, Wi-Fi direct, Zig-Bee, Bluetooth, and wired network. The communicator 110 may transmit various signals received externally to the processor 120, and transmit the various signals externally according to the control of the processor 120.

The processor 120 may be a configuration to control the overall operation of the server 100. For example, the processor 120 may control elements of various hardware or software included in the server 100, and perform various data processing and calculations. In addition, the processor 120 may load instructions or data received from at least one of other elements to the memory, process the loaded instructions or the loaded data, and store various data to a non-volatile memory. To this end, the processor 120 may be implemented as a processor (e.g., embedded processor) dedicated to performing the relevant operation, or as a generic-purpose processor (e.g., central processing unit (CPU) or application processor) capable of performing the relevant operations by executing one or more software programs stored in the memory device.

The processor 120 may, based on service being requested from one of other electronic apparatuses connected to the network such as the server apparatus 100, search for a robot capable of performing operations required by the requested service from robots providing services different from the service. When a robot is searched, the processor 120 may control the searched robot to perform the requested service.

The processor 120 may, based on there being a robot dedicated to providing the requested service, transmit a control instruction to the robot and provide the requested service directly.

In addition, the processor 120 may, after sorting the tasks constituting the service based on service being requested, confirm operations necessary in performing each task and search for robots capable of performing the operations. The processor 120 may identify the possibility on a task basis according to the search results. The processor 120 may transmit the identified result to other electronic apparatuses to show the user.

Based on dividing and verifying on a task basis, the processor 120 may identify what task is necessary for performing the service, what operation is necessary for performing the task, and the like based on the service and information related to the service. The storage may include tasks required by each type of service, operations necessary in performing the task, information on the robot connected to the network and operations performable by each robot, and the like. The storage may be stored and implemented in an independent apparatus provided externally of the server apparatus 100. The processor 120 may add and update information transmitted from the various electronic apparatuses connected to the network to the storage. For example, if new operations may be performed due to a robot being added or updated, operation information may be received from the robot and added to the database.

For example, based on the processor 120 receiving information on a washing service request, the processor 120 may identify that a plurality of tasks such as gather laundry, sort laundry, use washer, use dryer, and organize, is required in order to perform the washing service. In order to perform 'gather laundry' task, the processor 120 may identify operations such as move operation, use one hand operation, use both hands operation, recognize object operation, pick up operation, relocate operation may be included.

In addition, the processor 120 may receive information on a performing operation of the robot 20 from the robot 20 through the communicator 110. The processor 120 may store information on operations performable by the robot from the robot 20 in the storage (not shown).

Further the processor 120 may use operations performable by the robot received from the robot 20 to identify tasks that the robot 20 may perform from the tasks included in the service, and a detailed description may be provided below describing the above with reference to FIG. 4.

FIG. 4 is a diagram for identifying a task capable of being performed by a robot according to an embodiment of the disclosure.

At least one or more operations may be required to perform one task. One operation may be performed by one robot, or may also be performed by a plurality of robots, The processor 120 may search for a robot capable of necessary operations in the performing of a task corresponding to the service from information related to the service stored in the storage.

In addition, the processor 120 may, by extracting tasks included with operations capable of being performed by the robot 20 from tasks included in the service, identify task that the robot 20 may perform. More specifically, the storage includes pre-set operations required for performing tasks, and based on identifying that the operations may be performed by the robot, the relevant task may be identified as a task that is performable by a robot.

For example, as in FIG. 4, the processor 120 may be assumed as identify the task 611 for the washing service and the operation 612 necessary for each task, and identify the function of the robot A and B and operations 610, 620 and 630.

The processor 120 may search if there is a robot that may perform respective operations required in performing the task. For example, the processor 120 may, after searching for a robot capable of performing the 'move' operation from robots in the system, identify that robot A is capable of performing the 'move' operation of the 'gather laundry' task.

When one or more robots perform all of the plurality of operations included in one task, the relevant task may be identified as a task that a robot may perform. However, even when one or more robots are incapable of performing all of the operations included in one task, if the minimally required operation in performing the task is performed, the relevant task may be identified as a task that the robot may perform. The processor 120 may obtain information on the minimally required operation from information related to service stored in the storage or through user input through the electronic apparatus 10.

For example, the processor 120 may identify that at least 'recognize object' and 'move' operations are required for performing gather laundry operation. If the processor 120 identifies that 'move' operation may be performed by robot A, 'recognize object' operation may be performed by robot B, the processor 120 may identify that the 'gather laundry' task may be performed by robot A and robot B.

In this case, robot B may recognize laundry and transmit a position information of the laundry to the server 100, and the server 100 may again transmit the information to robot A. Further, robot A which identified the position of the laundry may use the cleaning map included therein to move the laundry by identifying the shape of the space and the position of the laundry and moving to a specific location.

The processor 120 may, even if the operation required to perform the task and the operation that the robot may perform does not match, identify whether the operation included in the task may be performed using the program included in the server 100 and the operation of the robot. For example, in the case of recognizing object, the processor 120 may obtain an image from the robot, and recognize the object required in the task using recognition program included in the server 100. In this case, the processor 120 may identify that the robot performing the 'photograph image' operation may be capable of performing 'recognize object' operation.

The processor 120 may use other electronic apparatuses 30 and 40 other than the robot 20 to identify whether the task may be performed. For example, the processor 120 may obtain an image from the electronic apparatus 40 including a camera sensor, and the like.

After identifying the task that the robot may perform using the method as described in FIG. 4, the processor 120 may perform robot scheduling on the service requested by the user. The robot scheduling may refer to identifying a task that a specific robot may perform from a plurality of tasks constituting the service requested by the user and assigning the relevant task to the time table of the robot capable of performing the task taking into consideration the time the service is to be completed, the execution time per task, operation related to the task, work time performing the operation, state of the robot, tasks already assigned to the robot, and the like.

The processor 120 may identify the time of completion for each task according to scheduling information of the user, and determine the work time of the robot performing the operation required by each task according to the completion time requested by the user.

For example, based on receiving a request for the washing to be completed by 5:00 post meridiem (PM), the processor 120 may identify that 'gather laundry' should be performed at 12:30 PM, 'use washer' should be performed at 1:45 PM, and 'use dryer' should be performed by 3:30 PM taking into consideration the task performing time of the robot. In addition, the processor 120 may, based on identifying that there is no robot present to perform a 'hang laundry' task, identify that the 'hang laundry' task is to be performed by the user and perform robot scheduling excluding the 'hang laundry' task.

As in the example above, if robot A which is to perform 'gather laundry' is scheduled to clean a room from 12:00 PM to 1:00 PM, the processor 120 may identify that the robot is to perform 'gather laundry' task at 10:45 ante meridiem (AM) taking into consideration the task assignment state of robot A and the performing time for 'gather laundry' task. Accordingly, robot B, which is to perform 'gather laundry' task together with robot A, may also be identified as having to perform 'gather laundry' task at 10:45 AM.

The processor may, after completing robot scheduling, transmit information on operations related to the task that the robot 20 is to perform and the work time for performing the task to the robot 20.

In addition, the processor 120 may transmit a perform instruction of an operation related to the scheduled task to the robot 20. If operations of a plurality of robots are necessary for performing one task, the processor 120 may transmit the perform instruction of the operation related to the task scheduled for each of the plurality of robots.

In this regard, the processor 120 may transmit a control instruction to the searched robot for the series of operations necessary in performing the task to be sequentially performed.

For example, as a result of robot scheduling, robot A may be identified as having to perform the 'move' operation and robot B may be identified as having to perform a 'capture image' in order to perform the 'gather laundry' task. The processor 120 may use information related to the service stored in the storage to identify that the 'capture image' operation is to be performed before the 'move' operation is performed, and the processor 120 may transmit the 'move' operation perform instruction to robot A after transmitting the 'capture image' operation perform instruction to robot B The processor 120 may, before transmitting the operation perform instruction to the robot 20, transmit information on the task assigned to the robot and the work time in performing the task to the electronic apparatus 10. In addition, the processor 120 may transmit information on the task assigned to the robot and work time in performing the task from the plurality of tasks necessary in performing the service to the electronic apparatus 10.

In addition to the above, the processor 120 may transmit the request for verification of whether operations related to the task have been performed to the electronic apparatus 10. Based on receiving a verification instruction on performing of operation from the electronic apparatus 10, the perform instruction of the operation related to the task may be transmitted to the robot 20.

The server 100 may receive a request information on a plurality of services, and in this case the processor 120 may identify the plurality of tasks required for each of the plurality of services. Further, the work time of the robot may be scheduled taking into consideration the operation that the robot may perform from the plurality of tasks required for each of the plurality of services.

Figure 5:
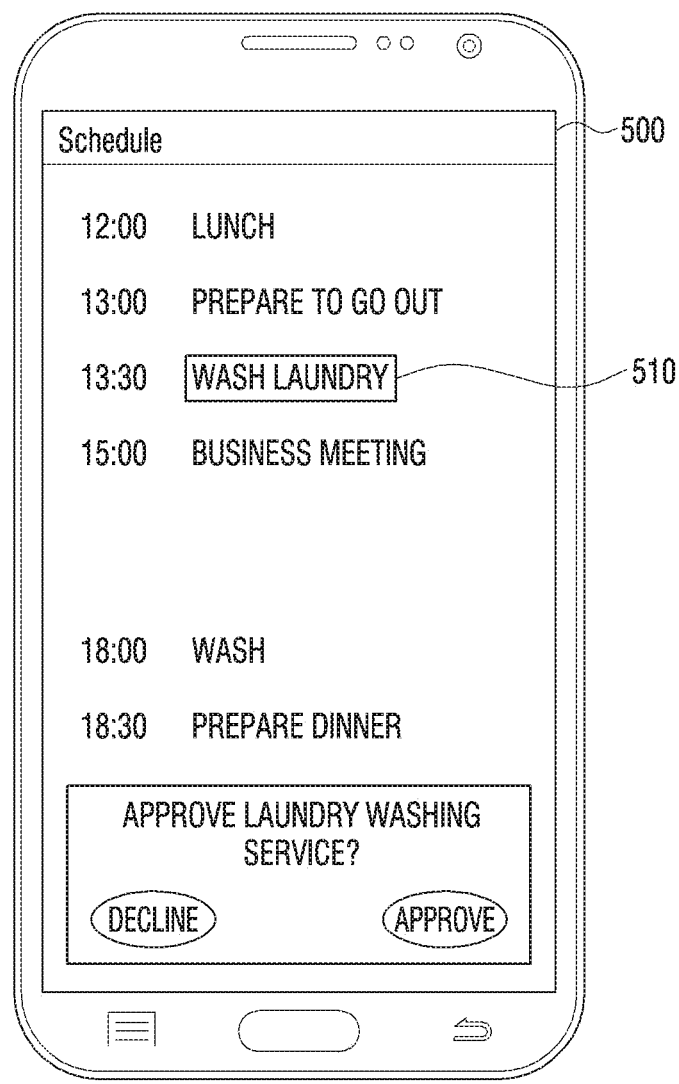
FIGS. 5 to 7 are diagrams for describing a service and a task information providing method according to an embodiment of the disclosure.
Figure 6:
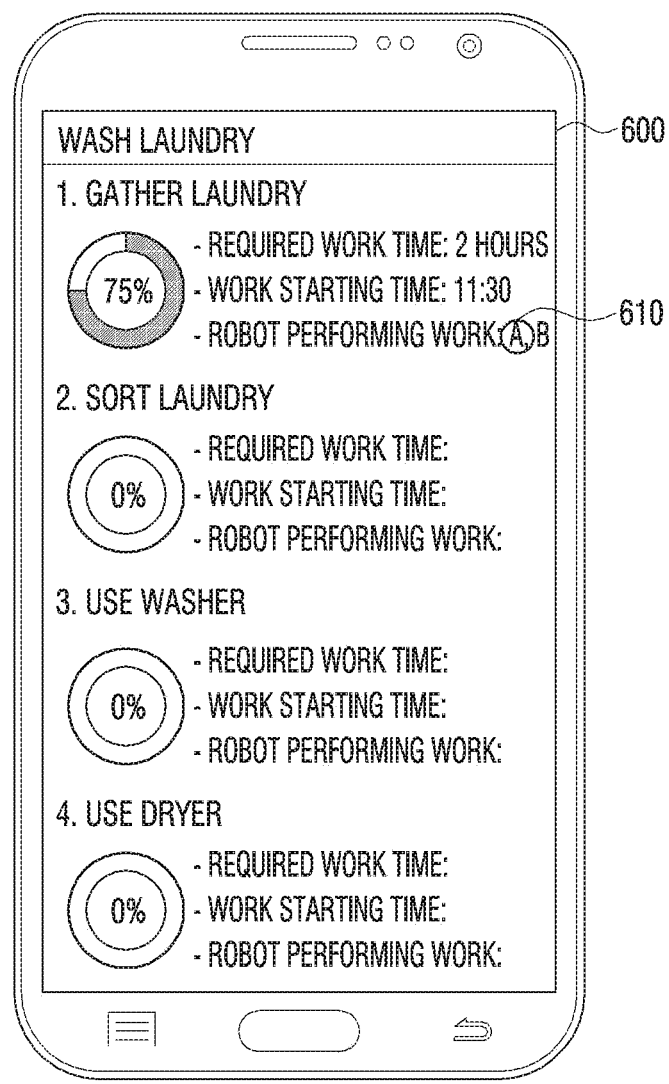
Figure 7:
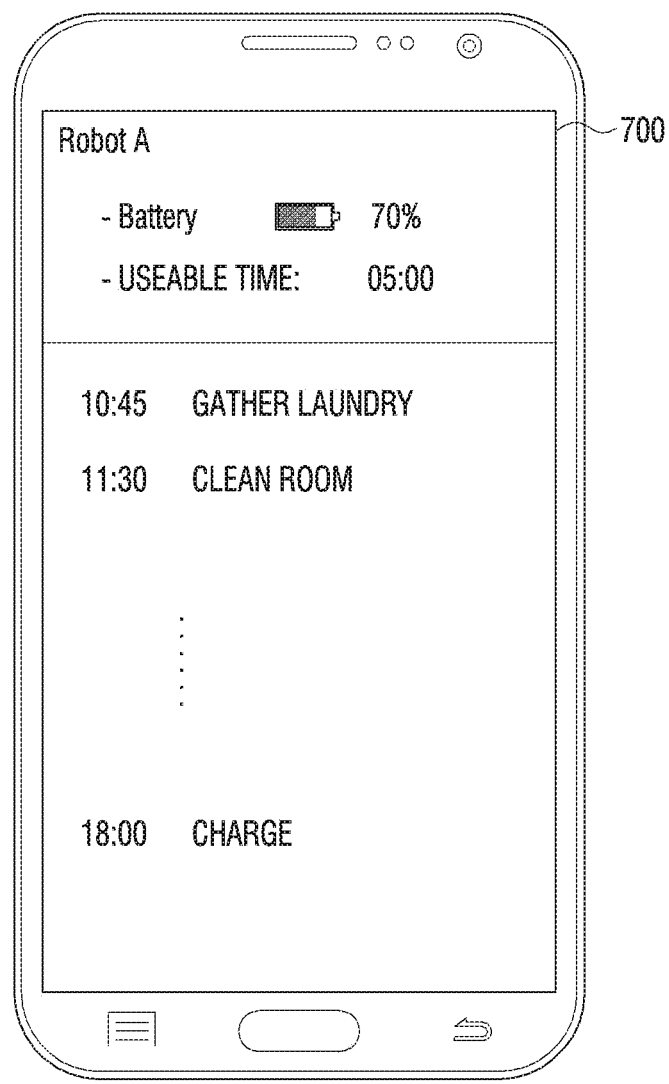

FIGS. 5 to 7 are diagrams for describing a service and a task information providing method according to an embodiment of the disclosure.

According to an embodiment, FIG. 5 illustrates a screen displayed in the electronic apparatus 10, which received service information from the server 100 after robot scheduling has been completed.

The electronic apparatus 10 may receive service and task information from the server 100. The service information may be displayed together with the schedule of the user. For example, the service information may be displayed together with the scheduling information of the user using a calendar application included in the electronic apparatus 10. In addition, the scheduling information of the user stored in the server 100 may also be used. That is, the electronic apparatus 10 may receive the scheduling information of the user, service information and task information from the server 100 and display the scheduling information of the user and the service information.

In addition, the electronic apparatus 10 may display a user interface (UI) requesting whether to approve service together therewith. If the user declines the service, the service and task information may be deleted from the schedule of the user. Alternatively, if the user approves service, an approval message may be sent to the server 100.

Based on service information displayed in the schedule of the user being selected, the task included in the service and information related to the task may be displayed.

According to an embodiment, FIG. 6 is a diagram illustrating a screen displayed after service information displayed on the electronic apparatus 10 is selected.

For example, when service information is selected, a plurality of tasks related to the service and information related to the task may be displayed. Information related to the task may include information such as progress of the task, required time, start time, and performing robot. For the sake of user convenience, progress of the task may be displayed in graphs, figures, numbers, and the like.

For example, if the current time is 1 PM, and if gather laundry task is scheduled to be performed by robot A and robot B for two hours from 11:30 AM, information that the gather laundry task has progressed 75 percent (%) by robot A and robot B may be displayed.

The electronic apparatus 10 may display not only tasks currently in progress, but also tasks to be in progress. In addition, tasks not included in robot scheduling may be displayed even when robot scheduling was not performed due to identifying that no robot is present to perform the task from the tasks to be in progress. For tasks that have not been robot scheduled, only the name of the task may be displayed and information on the required time, the start time, the performing robot, and the like may not be displayed. Although not limited thereto, the electronic apparatus 10 may also only display tasks to be performed by the robot.

In a screen displayed with task information, the user may select identification information of the robot set to perform the task.

According to an embodiment, FIG. 7 illustrates a screen displayed when robot identification information is selected based on task information being displayed, and the robot information may refer to information capable of identifying the robot such as robot identification (ID), name, device number, and internet protocol (IP) address.

When robot identification information is selected, information on the corresponding robot may be displayed. For example, the display screen may display identification number such as robot ID, name, and device number, battery information of the robot, useable time of the robot based on battery information, and scheduling information of the robot.

The scheduling information of the robot may refer to the task schedule of the robot according to flow of time, and not only tasks robot scheduled by the server 100 but also tasks including the original function of the robot may be displayed.

For example, based on robot A being scheduled to perform the gather laundry task at 11:30 AM as a robot cleaner, not only the gather laundry task but also clean room task including the original function of automatic cleaning of robot A may be displayed in the scheduling information of robot A.

In addition, if the task displayed in the scheduling information is selected by the user, service and task related information may be displayed as in FIG. 6.

Figure 8:
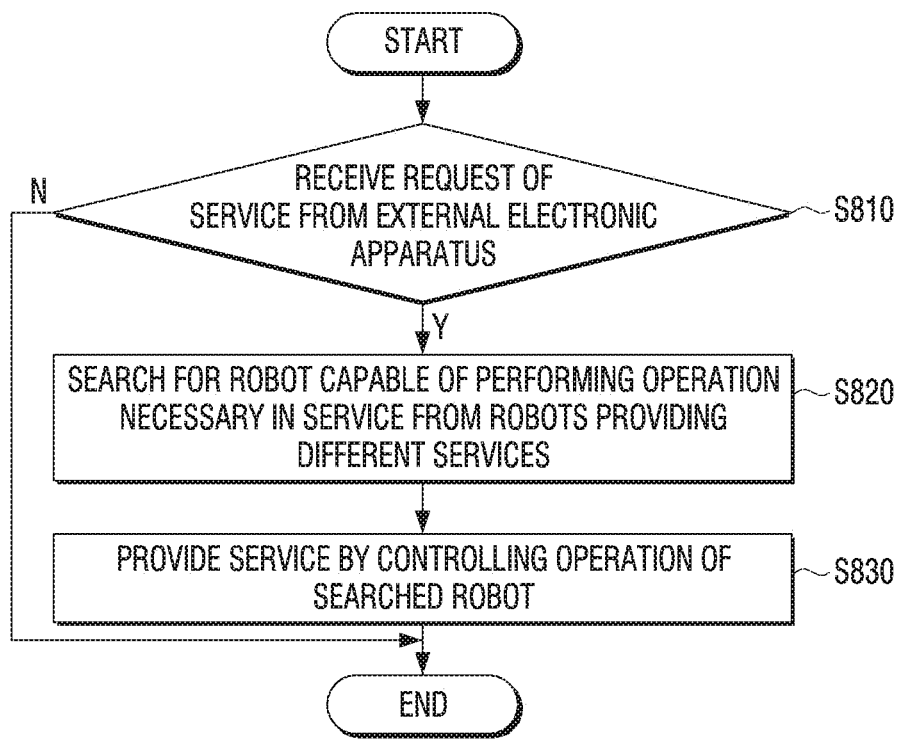
FIG. 8 is a flowchart for describing a service providing system according to an embodiment of the disclosure.

FIG. 8 is a flowchart for describing a service providing system according to an embodiment of the disclosure.

First, based on receiving a request of first service from an external electronic apparatus, a robot capable of performing the operation required in the service from robots providing services different from the requested service may be searched on the network (S820).

Next, the operation of the searched robot may be controlled to provide the service (S830).

In this regard, a robot capable of performing an operation necessary in performing the task corresponding to the requested service may be searched based on the storage stored with information on tasks required by the types of service, operations necessary in performing the task, and robots connected to the network and performable operations by the robot.

In addition, based on receiving operation information from the robot connected to the network, the received operation information may be added to the storage.

Further, based on scheduling information of the user being input, a completion time for each task according to the scheduling information of the user may be determined, and the work time of the robot performing the required operation in each task may be scheduled according to the completion time.

In addition, based on a plurality of services being requested, the work time of the robot may be scheduled taking into consideration the task requested in each service and the operation included in the relevant task.

The request for verifying whether the operation related to the identified task has been performed may be transmitted to the electronic apparatus, and based on receiving the verification instruction on performing of the operation from the electronic apparatus, the perform instruction of the operation related to the identified task may be transmitted to the robot.

In addition, information on the task assigned to the robot and the work time in performing the task may be transmitted to the electronic apparatus.

If a service is requested, the operation necessary in performing each task may be verified and robots capable of performing the operations may be searched after the tasks constituting the service is sorted, and the possibility may be identified on a task basis according to the searched results.

A non-transitory computer readable medium stored with a program sequentially performing a service providing method according the disclosure may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium such as, for example, a compact disc (CD), a digital versatile disc (DVD), a hard disc, a Blu-ray disc, a universal serial bus (USB), a memory card, a read only memory (ROM), and the like, and provided.

In addition, although a bus is not shown in the above-described block diagram illustrating the electronic apparatus, communication between each element in the electronic apparatus may be performed through the bus. Further, a processor such as a CPU and a microprocessor performing the various operations described above in the electronic apparatus may be further included, and a memory for performing the various operations described above in the electronic apparatus may also be further included.

In addition, while present disclosure has been illustrated and described with references to various example embodiments thereof, the present disclosure is not limited to the specific embodiments described. It will be understood by those skilled in the art that various changes in form and details may be made therein without departing from the spirit and scope of the disclosure, and the various changes in form and details are not to be understood as individual from the technical idea or the scope of the disclosure.

What is claimed is:

1. An electronic apparatus comprising:
    a storage storing information of tasks required by each service of a plurality of services, operations necessary in performing the tasks, information on a plurality of robots connected to a network, and information on operations performable by each robot of the plurality of robots;
    a communicator connected to the network; and
    a processor configured to:
        based on a first service of the plurality of services being requested from a first electronic apparatus of a plurality of other electronic apparatuses connected through the network, identify first operations required to perform first tasks required by the first service based on the information of the tasks required by each service of the plurality of services and the operations necessary in performing the tasks,
        based on the information on the operations performable by each robot of the plurality of robots, identify at least two robots capable of sequentially performing the identified first operations from among the plurality of robots according to an operation sequence of the identified first operations, the identified at least two robots including a first robot and a second robot,
        based on a first image obtained from an external apparatus, the external apparatus separate from the plurality of robots and the first electronic apparatus, determine whether a task of the first tasks required by the first service is performable,
        perform scheduling to assign the task of the first tasks to a timetable of the first robot for the first service, based on a determination of the task of first tasks is performable,
        transmit a first control instruction for performing an initial operation among the identified first operations to the first robot through the communicator,
        transmit information on progress of at least one of the first tasks to the first electronic apparatus,
        transmit a request for verifying whether the initial operation is performed by the first robot to the first electronic apparatus, and
        based on a response verifying performance of the initial operation being received from the first electronic apparatus, transmit a second control instruction on performing of a subsequent operation among the first operations to the second robot,
    wherein the identification of the at least two robots comprises a determination that the first robot is capable of performing only a first portion of the initial operation required in the requested first service and a determination that a second portion of the initial operation is performable by the processor of the electronic apparatus,
    wherein the first portion of the initial operation is performed by the first robot, and the second portion of the first operation is performed by the processor of the electronic apparatus based on the first portion of the initial operation, and wherein the second portion of the initial operation comprises receiving a second image from the first robot and recognizing an object, in the second image, required in a task based on a recognition program of the electronic apparatus.

2. The electronic apparatus of claim 1, wherein the processor is further configured to, based on receiving additional information on operations performable by a particular robot from the plurality of robots from the particular robot, the particular robot connected to the network, add the received additional information to the storage.

3. The electronic apparatus of claim 1, wherein the processor is further configured to, based on a scheduling information of a user being input through the communicator, identify a completion time for each of the first tasks according to the scheduling information of the user, and schedule a work time of the at least two robots for performing operations required by each of the first tasks according to the completion time.

4. The electronic apparatus of claim 1, wherein the processor is further configured to, based on a second service among the plurality of services being requested through the communicator, schedule a work time of the at least two robots taking into consideration second tasks required in the second service and operations included in a relevant task of the second tasks.

5. The electronic apparatus of claim 1, wherein the processor is further configured to transmit information on a task among the first tasks assigned to the first robot and a work time for performing the task to the first electronic apparatus through the communicator.

6. A service providing method using an electronic apparatus connected to a network, the service providing method comprising:

storing, at a storage, information of tasks required by each service of a plurality of services, operations necessary in performing the tasks, information on a plurality of robots connected to the network, and information on operations performable by each robot of the plurality of robots;

receiving a request for a first service among a plurality of services from a first electronic apparatus of a plurality of other electronic apparatuses connected through the network;

identifying first operations required to perform first tasks required by the first service based on the information of the tasks required by each service of the plurality of services and the operations necessary in performing the tasks;

based on the information on the operations performable by each robot of the plurality of robots, identifying at least two robots capable of sequentially performing the identified first operations from among the plurality of robots according to an operation sequence of the identified first operations, the identified at least two robots including a first robot and a second robot;

based on a first image obtained from an external apparatus, the external apparatus separate from the plurality of robots and the first electronic apparatus, determining whether a task of the first tasks required by the first service is performable, performing scheduling to assign the task of the first tasks to a timetable of the first robot for the first service, based on a determination of the task of first tasks is performable, transmitting a first control instruction for performing an initial operation among the identified first operations to the first robot through a communicator of the electronic apparatus;

transmitting information on progress of at least one of the first tasks to the first electronic apparatus, transmitting a request for verifying whether the initial operation is performed by the first robot to the first electronic apparatus; and based on a response verifying performance of the initial operation being received from the first electronic apparatus, transmitting a second control instruction on performing of a subsequent operation among the first operations to the second robot, wherein the identification of the at least two robots comprises a determination that the first robot is capable of performing only a first portion of the initial operation required in the requested first service and a determination that a second portion of the initial operation is performable by a processor of the electronic apparatus, wherein the first portion of the initial operation is performed by the first robot, and the second portion of the first operation is performed by the processor of the electronic apparatus based on the first portion of the initial operation, and wherein the second portion of the initial operation comprises receiving a second image from the first robot and recognizing an object, in the second image, required in a task based on a recognition program of the electronic apparatus.

7. The service providing method of claim 6, further comprising:

based on receiving additional information on operations performable by a particular robot from the plurality of robots from the particular robot, the particular robot connected to the network, adding the received additional information to the storage.

8. The service providing method of claim 6, further comprising:

based on scheduling information of a user being input, identifying a completion time for each of the first tasks according to the scheduling information of the user and scheduling a work time of the at least two robots performing operations required in each of the first tasks according to the completion time.

9. The service providing method of claim 6, further comprising:

based on a second service among the plurality of services being requested, scheduling a work time of the at least two robots taking into consideration second tasks required in the second service and operations included in a relevant task of the second tasks.

10. The service providing method of claim 6, further comprising:

transmitting information on a task among the first tasks assigned to the first robot and a work time performing the task to the first electronic apparatus.

11. The service providing method of claim 8, further comprising:

providing scheduling information to the first electronic apparatus to request, from the user, approval of the requested first service as scheduled.

12. The service providing method of claim 8, further comprising:
   in response to receiving a message declining the requested first service as scheduled, deleting service and task information corresponding to the first service from a schedule of the user.

13. The service providing method of claim 6, wherein the external apparatus comprises one of an appliance or a television.

* * * * *